(12) United States Patent
Püschner et al.

(10) Patent No.: US 12,499,343 B2
(45) Date of Patent: Dec. 16, 2025

(54) WAFER-LEVEL PACKAGE SENSOR DEVICE

(71) Applicant: Infineon Technologies AG, Neubiberg (DE)

(72) Inventors: Frank Püschner, Kelheim (DE); Mark Pavier, East Grinstead (GB); Bernd Ebersberger, Egmating (GB)

(73) Assignee: Infineon Technologies AG, Neubiberg (DE)

( * ) Notice: Subject to any disclaimer, the term of this patent is extended or adjusted under 35 U.S.C. 154(b) by 84 days.

(21) Appl. No.: 18/524,353

(22) Filed: Nov. 30, 2023

(65) Prior Publication Data

US 2024/0202485 A1 Jun. 20, 2024

(30) Foreign Application Priority Data

Dec. 15, 2022 (DE) .......................... 102022133451.1

(51) Int. Cl.
| | | |
|---|---|---|
| *G06K 19/077* | (2006.01) | |
| *G06K 19/07* | (2006.01) | |
| *G06V 40/13* | (2022.01) | |

(52) U.S. Cl.
CPC ... *G06K 19/07756* (2013.01); *G06K 19/0718* (2013.01); *G06K 19/07775* (2013.01); *G06V 40/1306* (2022.01)

(58) Field of Classification Search
CPC ......... G06K 19/07756; G06K 19/0718; G06K 19/07775; G06V 40/1306
See application file for complete search history.

(56) References Cited

U.S. PATENT DOCUMENTS

| 8,564,314 B2 * | 10/2013 | Shaikh | .................. G06F 3/0445 324/687 |
|---|---|---|---|
| 2017/0277936 A1 | 9/2017 | Slottner | |
| 2020/0184173 A1 * | 6/2020 | Jiang | ................ G06K 19/07773 |

FOREIGN PATENT DOCUMENTS

| DE | 10314682 A1 | 10/2003 |
|---|---|---|
| DE | 102017200124 A1 | 7/2018 |
| DE | 102019128464 A1 | 4/2021 |
| DE | 102020108927 A1 | 9/2021 |

OTHER PUBLICATIONS

K. Heyman, L. Peters: Fan-Out Packaging Gets Competitive. In: Semiconductor Engi-neering. Bearbeitungsstand: Aug. 18, 2022. URL: https://semiengineering.com/fan-out ••packaging-gets-competitive/ [abgerufen am Jul. 26, 2023].
Jul. 29, 2023 (DE) Office Action—App. 102022133451.1.

* cited by examiner

*Primary Examiner* — Sonji N Johnson
(74) *Attorney, Agent, or Firm* — Banner & Witcoff, Ltd.

(57) ABSTRACT

A wafer-level package sensor device including a capacitive sensor, a controller which is electrically conductively connected to the sensor, wherein the capacitive sensor is formed by partially overlapping redistribution layer tracks of the wafer-level package sensor device formed in different planes, and multiple contact surfaces connected to the controller, which are configured to electrically couple to a chip card module carrier using a flip-chip connection.

18 Claims, 6 Drawing Sheets

WAFER-LEVEL PACKAGE SENSOR DEVICE

TECHNICAL FIELD

The disclosure relates to a wafer-level package sensor device, a chip card module, a method for forming a wafer-level package sensor device, and a method for forming a chip card module.

BACKGROUND

Nowadays there is a clear trend toward chip cards or smart cards, e.g. for banking applications or access permits, which are equipped with biometric sensors for authentication, e.g. with fingerprint sensors.

However, these cards have a complex structure with multiple components electrically connected to one another. For example, the fingerprint sensor can be equipped with a chip (which can provide security-related functions and is then also referred to as a secure element or secure element chip) and be electrically conductively connected to an antenna.

For broad acceptance, mass-market applications such as payment/banking applications must be both cost-effective and comply with prescribed reliability and/or security requirements, e.g. satisfy the requirements of the Clinical Quality Measures (CQM) standard with regard to mechanical reliability.

In the known art, various fingerprint sensors have been proposed, which differ in terms of the type of sensor, the sensor material and the method of assembling the smart card.

In SE 1750836 A1, a fingerprint module is described which has a fingerprint sensor that is inserted into an opening of a substrate and is electrically conductively connected to a Radio Frequency Identification (RFID) antenna, which is used for both communication and for generating power for the sensor.

According to a known assembly technology, a T-shaped chip module is used, which is not configured for contactless use, however.

There is a need for a cost-effective, reliable and easy-to-assemble biometric sensor (e.g. a fingerprint sensor) for integration into a chip card, e.g. a so-called smart card.

Printed Circuit Board (PCB) substrate-based biometric fingerprint sensors are typically manufactured from PCB panels that are separated into pieces, e.g. by means of punching, milling or cutting. Thereafter, the chip modules are available as individual modules, which is not a standard form of provision for the production of a smart card.

To date, PCB substrate-based biometric fingerprint sensors for biometric smart cards have not yet been mass-produced, so that the need to revise the production concepts in the direction of mass production has not yet arisen.

SUMMARY

In various exemplary aspects, a wafer-level package sensor device is provided, which is provided as a so-called FOWLP (Fan-Out Wafer Level Package).

This houses a sensor controller chip (in short: controller) and on a surface, a sensor array connected to the controller and consisting of redistribution tracks (RDL, from redistribution layer), or tracks of redistribution planes or layers.

For example, crossed tracks of the two topmost RDL layers can form a capacitive biometric sensor, such as a fingerprint sensor.

In various exemplary aspects, the biometric sensor, for example, the FOWLP sensor, may be arranged laterally adjacent to a secure element chip (SE) by means of low-cost chip card module assembly methods, such as FCOS.

In various exemplary aspects a wafer-level package sensor device is provided, which comprises a capacitive sensor, a controller, which is electrically conductively connected to the sensor, wherein the capacitive sensor is formed in partially overlapping redistribution layer tracks of the wafer-level package sensor device formed in different planes, and multiple contact surfaces connected to the controller, which are configured for electrical coupling to a chip card module carrier by means of a flip-chip connection.

BRIEF DESCRIPTION OF THE DRAWINGS

Exemplary aspects of the disclosure are shown in the drawings and will be explained in more detail in the following.

In the drawings.

DETAILED DESCRIPTION

Figure 1:
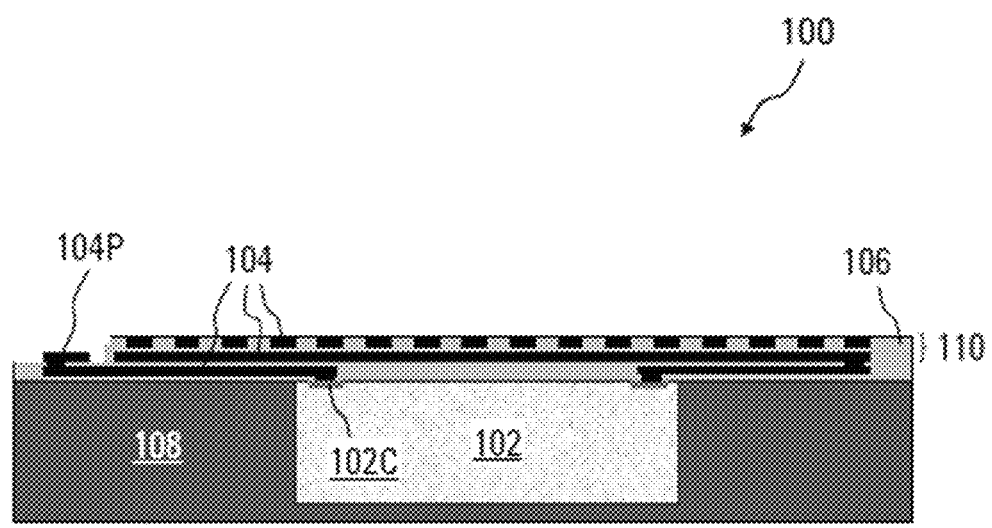
FIG. 1 shows a schematic cross-sectional view of a wafer-level package sensor device according to various exemplary aspects.

In the detailed description that follows, reference will be made to the attached drawings, which form part of this description and in which specific aspects in which the disclosure may be realized are shown for illustration purposes. In this respect, directional terms such as "at the top", "at the bottom", "in front", "behind", "frontal", "rear", etc. are used with respect to the orientation of the figures being described. Because components of aspects can be positioned in a number of different orientations, the directional terminology is used for illustration purposes only, and is in no way restrictive. It is understood that other aspects can be used and structural or logical changes can be made without departing from the scope of protection of the present disclosure. It goes without saying that the features of the various exemplary aspects described herein can be combined with one another, unless specifically stated otherwise. The following detailed description is therefore not to be understood in a restrictive sense, and the scope of protection of the present disclosure is defined by the attached claims.

For the purposes of this description, the terms "connected" and "coupled" are used to describe both a direct and an indirect connection, as well as a direct or indirect coupling. In the figures, identical or similar elements are labeled with identical reference signs, where this is appropriate.

Flip-chip mounting on a substrate (FCOS, Flip Chip on Substrate) is a cost-effective standard assembly process for integrating silicon chips into smart card modules or chip card modules.

The connection is formed, for example, between copper contacts of a carrier tape (the substrate) and exposed copper redistribution layer tracks (RDL tracks) on the (e.g. silicon) chip, e.g. by means of anisotropic conductive adhesive (ACA), isotropic conductive adhesive (ICA) or by means of soldering.

When Fan-Out Wafer-Level Packaging (FOWLP) is used, a sensor component, such as a fingerprint sensor, can be formed, which can be integrated into a chip card module in a manner similar to that of the silicon chip with the RDL contacts.

In various exemplary aspects the sensor FOWLP package combines a sensor controller chip with a sensor region formed by two of its RDL metallization track layers, for example, by the two topmost layers.

An array of crossed (e.g. Cu) tracks forms capacitors that are sensitive to (e.g. finger) contact.

The sensor array can be directly connected to the underlying controller chip. In some cases, depending on a chip pad layout, a third RDL layer may be required for the desired track routing.

One of the RDL layers, such as the lowest, second lowest, or another convenient RDL layer, can be used in addition to forming peripheral RDL contacts around the sensor region, which provide an external connection to the controller. In other words, by means of the lowest RDL layer (i.e., the one nearest to the controller) or the second lowest or other RDL layer, contact surfaces can be formed around the sensor in an edge region of the sensor module.

These contact surfaces can allow the sensor module (FOWLP) to be integrated into a chip card module in a similar manner to Secure Element Chip (SE).

The module tape has a cut-out region, e.g. a through-opening, into which the sensor module is inserted, so that a sensor surface of the sensor module in the chip card module is accessible even after its integration into a chip card.

The thickness of the chip card module may be arranged such that the sensor module extends into the carrier without it protruding over the chip card module carrier.

The sensor module with a thickness of less than 450 μm may be thin enough to allow simple integration into chip cards or smart cards.

Backend wafer-level processes are capable of producing metallization with a very fine line spacing (e.g. line width and line spacing of approximately 10 μm in each case). This is used to form the sensor region.

Dielectric layers can be produced with variable thickness, e.g. in a range of approximately 5 μm to approximately 20 μm, which can be used to optimize or adjust the electrical properties of the sensor.

By housing only the controller below the sensor (i.e. without the secure element chip and without optional additional discrete components), the costs of the sensor component can be significantly reduced compared to integration with other components, such as a secure element chip, in a Land Grid Array (LGA) package.

The size of the wafer-level package sensor device in various exemplary aspects can be as small as the sensor region, which has a favorable effect on the manufacturing costs, as in the case of FOWLP these scale with the surface area.

The module carrier tape connects the sensor component and the secure element chip. Both units and optional additional discrete components are mounted on the carrier tape in one or more separate passes of a standard FCOS roll-to-roll production line.

In various exemplary aspects, a more cost-effective biometric sensor is thus provided.

FIG. 1 shows a schematic cross-sectional view of a wafer-level package sensor device 100 according to various exemplary aspects.

The wafer-level package sensor device 100 has a capacitive sensor 110. The capacitive sensor 110 may be a biometric sensor, for example a fingerprint sensor or another type of biometric sensor which is suitable for detecting spatially resolved structural features by means of a capacitive sensor.

The capacitive sensor 110 can be formed by partially overlapping redistribution layers (RDL) 104 of the wafer-level package sensor device 100 formed in different planes.

In FIG. 1, for example, the individual tracks of the topmost RDL 104 extend into the plane of the paper, and in the plane underneath, which appears continuous in cross-section, the RDL 104 extends in tracks perpendicular to the upper lines, for example with a comparable spacing and number.

The lowest RDL 104 in the exemplary aspect illustrated in FIG. 1 is designed by way of example to form connections, etc. (including the contact surfaces described below).

Depending on the design of the individual RDL 104, however, it may be sufficient to provide only two RDLs 104 to form the capacitive sensor 110 (the intersections of the tracks form the array of capacitive elements) and to provide the connections (including the contact surfaces described below).

The RDL layers 104 can be, for example, structured copper layers, or may have or consist of a different material used in the known art for RDL layers.

The RDL layers 104 can be insulated from one another by means of dielectric layers 106. The dielectric layers 106 can comprise a material commonly used in the known art for this purpose, for example a polymer, for example, a polyimide, e.g. a low-temperature cross-linkable polymer (LTC).

The wafer-level package sensor device 100 further comprises a controller 102, which is electrically conductively connected to the sensor 110.

The wafer-level package sensor device 100 further comprises multiple contact surfaces 104P connected to the controller 102, which are configured for electrical coupling to a chip-card module carrier (in short: carrier) by means of a flip-chip connection.

The contact surfaces 104P are part of the RDL layers 104 (or of one of the RDL layers 104) and can be formed together with the (or one of the) RDL layers 104.

In the exemplary aspect of FIG. 1, the contact surface 104P has been formed together with the middle RDL layer 104.

The sensor 110 and the controller 102 can be arranged vertically stacked in the wafer-level package sensor device 100.

The multiple contact surfaces 104P and a sensor surface of the capacitive sensor 110 (in FIG. 1 its upper side) can be exposed on the same side of the wafer-level package sensor device 100 (in FIG. 1, for example, the upper side).

Figure 4:
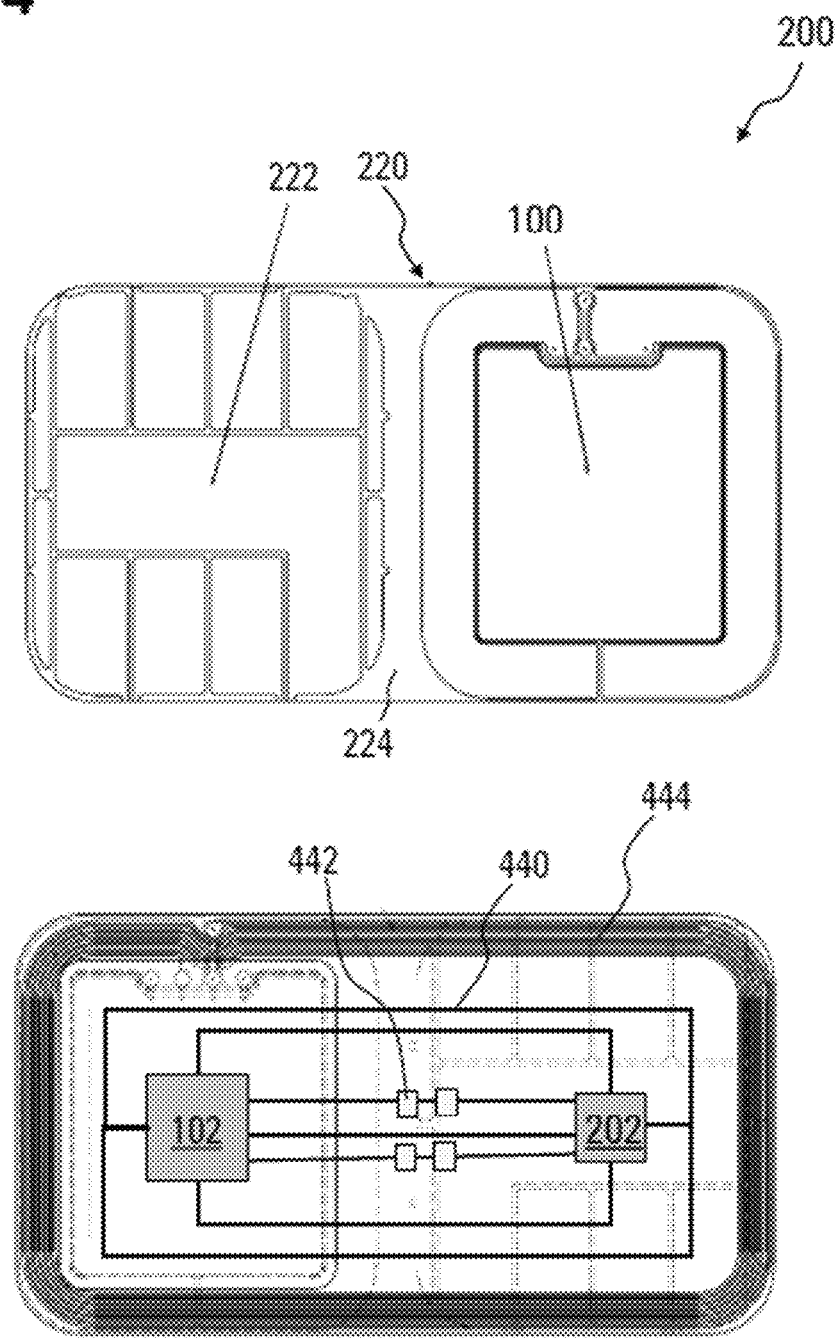
FIG. 4 shows schematic views from above (upper figure) or from below (lower figure) of a chip card module (for example, the chip card module from FIG. 2 or FIG. 3) according to various exemplary aspects.

The wafer-level package sensor device 100 can be free of additional, e.g. passive components (see the description for FIG. 4 where it is discussed where any additional components 442 may be provided instead).

Figure 2:
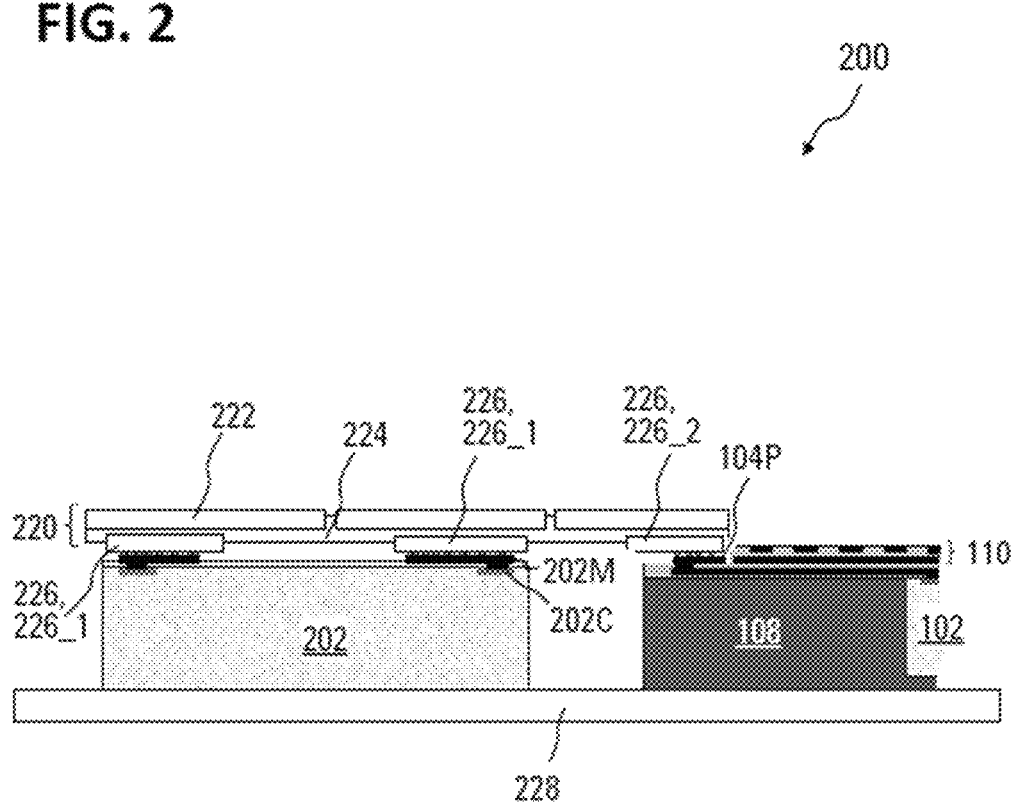
FIG. 2 shows a schematic cross-sectional view of a chip card module according to various exemplary aspects.
Figure 3:
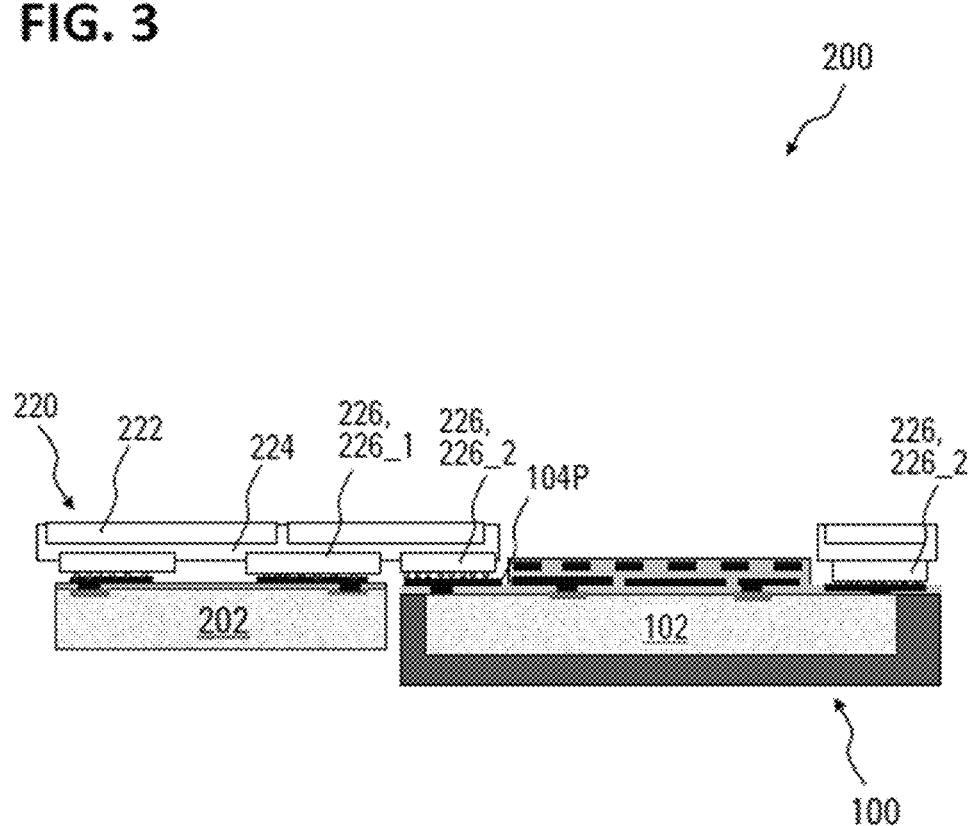
FIG. 3 shows a schematic cross-sectional view of a chip card module according to various exemplary aspects.

FIGS. 2, 3 and 4 each show a chip card module 200 according to various exemplary aspects, wherein FIGS. 2 and 3 each show a schematic cross-sectional view of the chip card module 200, and FIG. 4 shows a view from above and below.

The chip card module 200 has a wafer-level package sensor device 100 according to various exemplary aspects, for example as described above generally, or in connection with FIG. 1.

The chip card module 200 can additionally comprise a secure element chip 202 which is electrically conductively connected to the capacitive sensor 110.

The secure element chip 202 can be configured to perform security functions, for example, setting up an encrypted communication with an external reading device, to perform an identity check or to provide information for an identity check, etc.

The chip card module 200 further comprises a chip card module carrier 220 (in short: carrier) having a circuit 440 (see FIG. 4) connected to a first set of contact pads 226, 226_1 and to a second set of contact pads 226, 226_2.

The carrier 220 may comprise a base material 224, for example a plastic, for example a polymer such as polyimide or another suitable polymer. The circuit 440 may be formed on or in the base material 224.

The secure element chip 202 can be connected to the first set of contact pads 226_1, and the wafer-level package sensor device 100 can be connected to the second set of contact pads 226_2.

Both the wafer-level package sensor device 100 and the secure element chip 202 can be connected to the carrier 220 by means of flip-chip technology (also referred to as FCOS, for Flip-Chip on Substrate). Flip-chip assembly is a standard process in the manufacture of chip cards and chip card modules and is therefore cost-effective and suitable for mass production.

For mechanical and electrically conductive bonding, for example, an electrically conductive adhesive (e.g. an anisotropic conductive adhesive ACA), an isotropic conductive adhesive (ICA) or a solder can be used, e.g. a tin-based solder such as SnBi. Optionally, a non-conductive adhesive (NCA) can also be used for mechanical bonding.

The wafer-level package sensor device 100 can be mounted on the carrier 220 with its exposed contact surfaces 104P on the upper side by means of FCOS assembly. Since the sensor 110 on the upper side of the wafer-level package sensor device 100 is also exposed, the sensor surface of the sensor 110 faces the carrier 220, which has a (through-) opening in which the sensor 110 or the sensor surface is placed and is thus exposed on an upper side of the wafer-level package sensor device 100.

The controller 102 integrated in the wafer-level package sensor device 100 can be arranged with its contacts 102C facing towards the sensor 110. Accordingly, the controller contacts 102C can be contacted directly by the RDL 104, and the wafer-level package sensor device 100 can be formed without vias, in particular without vias through a housing material 108 (e.g. a molding material), into which the controller 102 can be embedded.

The chip card module 200 can additionally comprise a contact surface array 222 which is connected to the secure element chip 202 and configured for contact-based operation of the chip card module 200.

Alternatively or additionally, the chip card module 200 can comprise an antenna 444 which is connected to the secure element chip 202 and configured for contactless operation of the chip card module 200. The antenna 444 may be configured, for example, to couple to a booster antenna integrated in a chip card body of a chip card.

The secure element chip 202 and the wafer-level package sensor device 100 can be arranged laterally next to each other.

In various exemplary aspects, additional components 442 for operation of the chip card module 200 may be practical or necessary, for example passive components for tuning the antenna 444 or for other purposes.

The additional components 442 may be part of the circuit 440 in various exemplary aspects. The additional components 442 may be arranged, for example, between the wafer-level package sensor device 100 and the secure element chip 202. This enables a particularly space-saving design of the wafer-level package sensor device 100.

Figure 5:
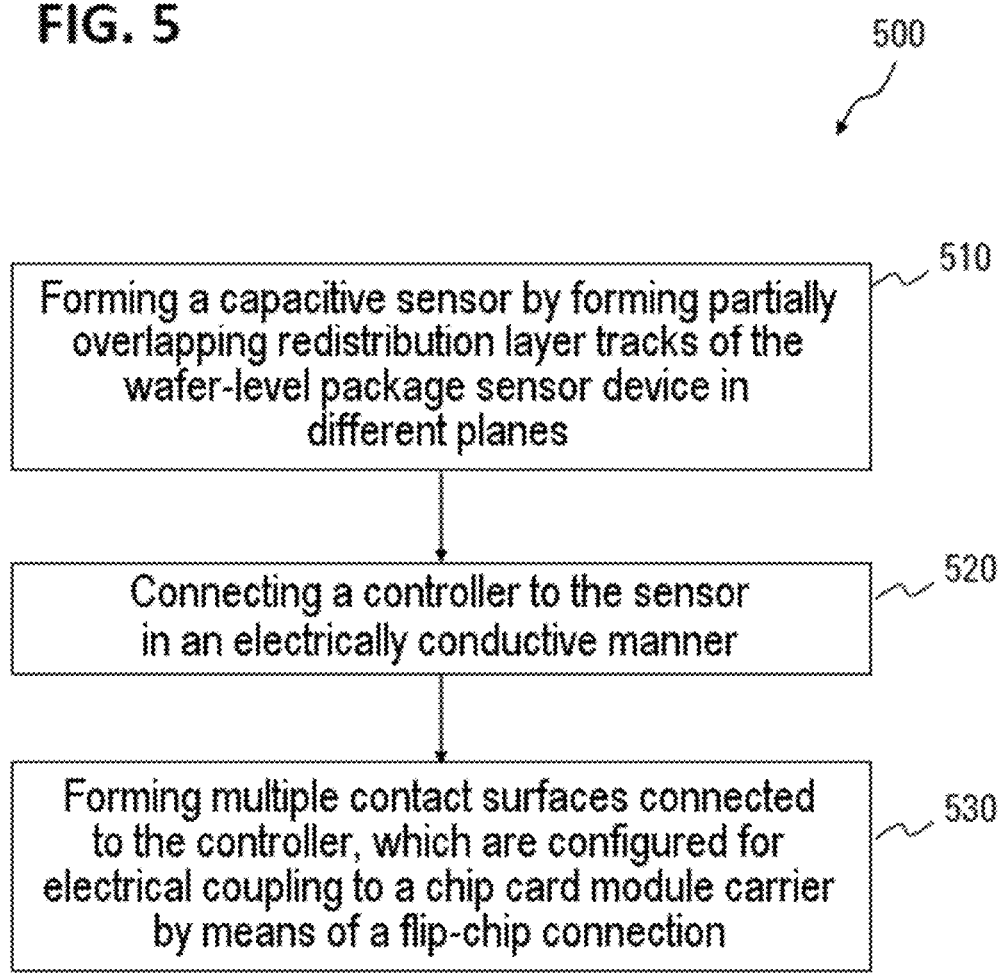
FIG. 5 shows a flowchart of a method for forming a wafer-level package sensor device according to various exemplary aspects.

FIG. 5 shows a flowchart 500 of a method for forming a wafer-level package sensor device according to various exemplary aspects.

The method comprises forming a capacitive sensor by forming partially overlapping redistribution layer tracks of the wafer-level package sensor device in different planes, connecting a controller to the sensor in an electrically conductive manner, and forming multiple contact surfaces connected to the controller, which are configured for electrical coupling to a chip card module carrier by means of a flip-chip connection.

The method can be implemented in various exemplary aspects in the sequence shown.

In various exemplary aspects, the sequence of the processes in the execution of the method can be changed. For example, the sensor (the RDL array) can be processed after the contacts to the controller.

Figure 6:
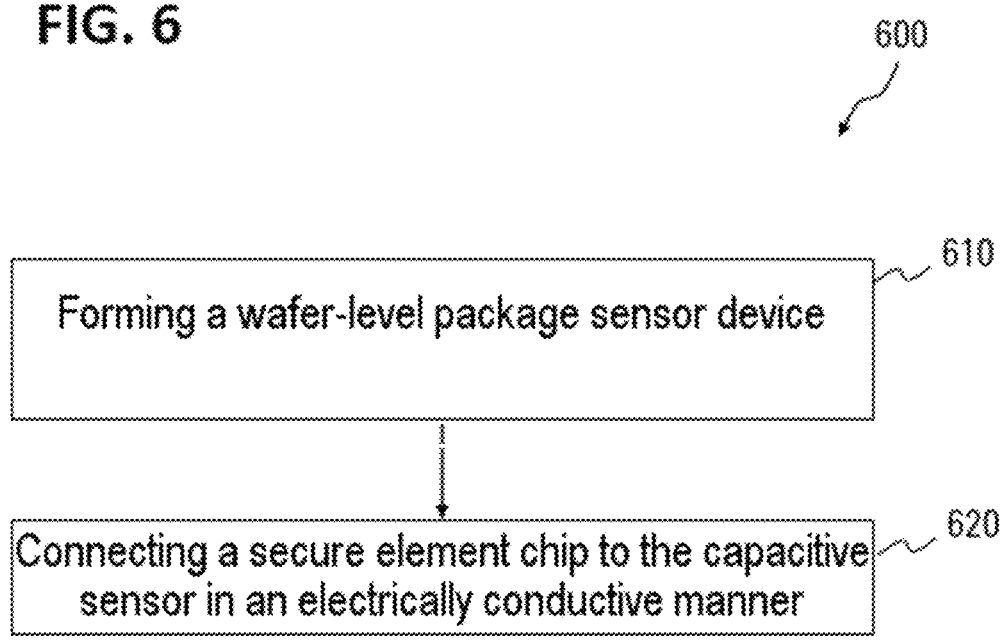
FIG. 6 shows a flowchart of a method for forming a chip card module according to various exemplary aspects.

FIG. 6 shows a flowchart 600 of a method for forming a chip card module according to various exemplary aspects.

The method comprises forming a wafer-level package sensor device according to any of the exemplary aspects, for example, as explained above in connection with FIG. 1 and/or FIG. 5 (610), and connecting a secure element chip to the capacitive sensor in an electrically conductive manner (620).

In the following text, a summary of some exemplary aspects is given.

Exemplary aspect 1 is a wafer-level package sensor device comprising a capacitive sensor, a controller, which is electrically conductively connected to the sensor, wherein the capacitive sensor is formed by partially overlapping redistribution layer tracks of the wafer-level package sensor device formed in different planes, and multiple contact surfaces connected to the controller, which are configured for electrical coupling to a chip card module carrier by means of a flip-chip connection.

Exemplary aspect 2 is a wafer-level package sensor device according to exemplary aspect 1, wherein the sensor and the controller are arranged vertically stacked in the wafer-level package sensor device.

Exemplary aspect 3 is a wafer-level package sensor device according to exemplary aspect 1 or 2, wherein the plurality of contact surfaces are formed as part of the redistribution layer tracks.

Exemplary aspect 4 is a wafer-level package sensor device according to any of the exemplary aspects 1 to 3, wherein the multiple contact surfaces and a sensor surface of the capacitive sensor are exposed on the same side of the wafer-level package sensor device.

Exemplary aspect 5 is a wafer-level package sensor device according to any of the exemplary aspects 1 to 4, wherein the wafer-level package sensor device is free of passive components.

Exemplary aspect 6 is a chip card module. The chip card module comprises a wafer-level package sensor device according to any of the exemplary aspects 1 to 5 and a secure element chip, which is electrically conductively connected to the capacitive sensor.

Exemplary aspect 7 is a chip card module according to exemplary aspect 6, which also comprises a carrier with a circuit which is connected to a first set of contact pads and to a second set of contact pads.

Exemplary aspect 8 is a chip card module according to exemplary aspect 7, wherein the secure element chip is connected to the first set of contact pads, and the wafer-level package sensor device is connected to the second set of contact pads.

Exemplary aspect 9 is a chip card module according to any of the exemplary aspects 6 to 8, further comprising a contact surface array which is connected to the secure element chip and configured for contact-based operation of the chip card module, and/or an antenna which is connected to the secure element chip and configured for contactless operation of the chip card module.

Exemplary aspect 10 is a chip card module according to exemplary aspect 7, wherein the secure element chip and the wafer-level package sensor device are arranged laterally next to each other.

Exemplary aspect 11 is a chip card module according to any of the exemplary aspects 7 to 10, wherein the secure element chip and the wafer-level package sensor device are connected to the carrier by means of flip-chip connections.

Exemplary aspect 12 is a method for forming a wafer-level package sensor device. The method comprises forming a capacitive sensor by forming partially overlapping redistribution layer tracks of the wafer-level package sensor device in different planes, connecting a controller to the sensor in an electrically conductive manner, and forming multiple contact surfaces connected to the controller, which are configured for electrical coupling to a chip card module carrier by means of a flip-chip connection.

Exemplary aspect 13 is a method according to exemplary aspect 12, wherein the sensor and the controller are arranged vertically stacked in the wafer-level package sensor device.

Exemplary aspect 14 is a method according to exemplary aspect 12 or 13, wherein the plurality of contact surfaces are formed together with some of the redistribution layer tracks.

Exemplary aspect 15 is a method according to exemplary aspects 12 to 14, wherein the multiple contact surfaces and a sensor surface of the capacitive sensor are exposed on the same side of the wafer-level package sensor device.

Exemplary aspect 16 is a method according to any of the exemplary aspects 12 to 15, wherein the wafer-level package sensor device is free of passive components.

Exemplary aspect 17 is a method according to any of the exemplary aspects 12 to 16, which further comprises forming a plurality of wafer-level package sensor devices as parts of a reconstituted wafer, and separating the reconstituted wafer into a plurality of wafer-level package sensor devices.

Exemplary aspect 18 is a method for forming a chip card module, which comprises forming a wafer-level package sensor device according to any of the exemplary aspects 12 to 17, and connecting a secure element chip to the capacitive sensor in an electrically conductive manner.

Exemplary aspect 19 is a method according to exemplary aspect 18, which also comprises providing a carrier with a circuit which is connected to a first set of contact pads and to a second set of contact pads.

Exemplary aspect 20 is a method according to exemplary aspect 19, further comprising connecting the secure element chip to the first set of contact pads, and connecting the wafer-level package sensor device to the second set of contact pads.

Exemplary aspect 21 is a method according to any of the exemplary aspects 18 to 20, further comprising providing a contact surface array which is connected to the secure element chip and configured for contact-based operation of the chip card module, and/or providing an antenna which is connected to the secure element chip and configured for contactless operation of the chip card module.

Exemplary aspect 22 is a method according to any of the exemplary aspects 18 to 21, wherein the secure element chip and the wafer-level package sensor device are arranged laterally next to each other.

Exemplary aspect 23 is a method according to any of the exemplary aspects 18 to 22, wherein the secure element chip and the wafer-level package sensor device are connected to the carrier by means of flip-chip connections.

Additional advantageous designs of the device are obtained from the description of the method and vice versa.

The invention claimed is:

1. A wafer-level package sensor device, comprising:
   a capacitive sensor;
   a controller which is electrically conductively connected to the sensor,
   wherein the capacitive sensor is formed by partially overlapping redistribution layer tracks of the wafer-level package sensor device formed in different planes; and
   multiple contact surfaces which are connected to the controller and configured to electrically couple to a chip-card module carrier using a flip-chip connection,
   wherein the multiple contact surfaces and a sensor surface of the capacitive sensor are exposed on a same side of the wafer-level package sensor device.

2. The wafer-level package sensor device as claimed in claim 1,
   wherein the sensor and the controller are arranged vertically stacked in the wafer-level package sensor device.

3. The wafer-level package sensor device as claimed in claim 1,
   wherein the multiple contact surfaces are formed as part of the redistribution layer tracks.

4. The wafer-level package sensor device as claimed in claim 1,
   wherein the wafer-level package sensor device is free of passive components.

5. A chip card module, comprising:
   a wafer-level package sensor device as claimed in claim 1; and
   a secure element chip, which is electrically conductively connected to the capacitive sensor.

6. The chip card module as claimed in claim 5, further comprising:
   a carrier with a circuit which is connected to a first set of contact pads and to a second set of contact pads.

7. The chip card module as claimed in claim 6,
   wherein the secure element chip is connected to the first set of contact pads, and the wafer-level package sensor device is connected to the second set of contact pads.

8. The chip card module as claimed in claim 6,
   wherein the secure element chip and the wafer-level package sensor device are arranged laterally next to each other.

9. The chip card module as claimed in claim 6, wherein the secure element chip and the wafer-level package sensor device are connected to the carrier using flip-chip connections.

10. The chip card module as claimed in claim 5, further comprising:
    a contact surface array, which is connected to the secure element chip and configured for contact-based operation of the chip card module; and/or
    an antenna which is connected to the secure element chip and configured for contactless operation of the chip card module.

11. A method for forming a wafer-level package sensor device, the method comprising:
    forming a capacitive sensor by forming partially overlapping redistribution layer tracks of the wafer-level package sensor device in different planes;
    connecting a controller to the sensor in an electrically conductive manner; and
    forming multiple contact surfaces which are connected to the controller and configured to electrically couple to a chip card module carrier using a flip-chip connection,
    wherein the multiple contact surfaces and a sensor surface of the capacitive sensor are exposed on the same side of the wafer-level package sensor device.

12. The method as claimed in claim 11, wherein the sensor and the controller are arranged vertically stacked in the wafer-level package sensor device.

13. The method as claimed in claim 11, wherein the multiple contact surfaces are formed together with some of the redistribution layers.

14. The method as claimed in claim 11, further comprising:
    forming a plurality of wafer-level package sensor devices as parts of a reconstituted wafer; and
    separating the reconstituted wafer into a plurality of wafer-level package sensor devices.

15. A method for forming a chip card module, comprising:
    forming a wafer-level package sensor device as claimed in claim 11; and
    connecting a secure element chip to the capacitive sensor in an electrically conductive manner.

16. The method as claimed in claim 15, further comprising:
    providing a carrier with a circuit which is connected to a first set of contact pads and to a second set of contact pads.

17. The method as claimed in claim 16, further comprising:
    connecting the secure element chip to the first set of contact pads; and
    connecting the wafer-level package sensor device to the second set of contact pads.

18. The method as claimed in claim 15, further comprising:
    providing a contact surface array which is connected to the secure element chip and configured for contact-based operation of the chip card module; and/or
    providing an antenna which is connected to the secure element chip and configured for contactless operation of the chip card module.

* * * * *